United States Patent [19]

Poltrock

[11] Patent Number: 4,858,699
[45] Date of Patent: Aug. 22, 1989

[54] SCRAPER DEVICE FOR AN AGRICULTURAL IMPLEMENT

[75] Inventor: Bruce A. Poltrock, Swan Hill, Australia

[73] Assignee: Grizzly Engineering Pty. Ltd., Victoria, Australia

[21] Appl. No.: 6,524

[22] Filed: Jan. 21, 1987

[30] Foreign Application Priority Data

Jan. 21, 1986 [AU] Australia ............ PH04294/86

[51] Int. Cl.⁴ .................................. A01B 15/16
[52] U.S. Cl. .......................... 172/558; 172/610
[58] Field of Search .............. 172/558, 563, 565, 606, 172/610, 547

[56] References Cited

U.S. PATENT DOCUMENTS

| | | | |
|---|---|---|---|
| 160,129 | 2/1875 | Underwood | 172/558 X |
| 467,862 | 1/1892 | Merrick | 172/558 |
| 588,383 | 8/1897 | Bissell | 172/565 |
| 989,748 | 4/1911 | Adams | 172/565 |
| 1,251,874 | 1/1918 | Dickinson | 172/558 |

FOREIGN PATENT DOCUMENTS

| | | |
|---|---|---|
| 145639 | 7/1950 | Australia . |
| 463671 | 7/1975 | Australia . |
| 506514 | 2/1979 | Australia . |
| 522035 | 6/1980 | Australia . |
| 79214/82 | 5/1984 | Australia . |
| 3317785 | 11/1984 | Fed. Rep. of Germany ...... 172/610 |

*Primary Examiner*—Richard J. Johnson
*Attorney, Agent, or Firm*—Seed and Berry

[57] ABSTRACT

A scraper device for clearing earth and other materials accumulated on ground working elements, such as discs of a plough. The scraper device is suspended from the frame and is free to swing toward the ground working element. When a layer of earth or other material has accumulated on the element, a blade on the device will engage the layer and bite into it, thereby removing the layer as rotation of the element continues. After the layer has been removed, the blade swings away from the element.

11 Claims, 4 Drawing Sheets

SCRAPER DEVICE FOR AN AGRICULTURAL IMPLEMENT

TECHNICAL FIELD

This invention relates to devices for removing earth from agricultural implements, and more particularly, to a scraper device for removing earth from an axially rotatable member of an agricultural implement.

BACKGROUND ART

Generally speaking the present invention can be regarded as an improvement on the earth clearing means which is disclosed in Australian Patent Application No. 27720/84. The earth clearing means described in the specification of that application is particularly suited to clearing earth and other foreign material from plough discs. It has a number of advantages but it does nevertheless have some drawbacks. As the agricultural implement is operated, the plough discs are rotated and any earth which is accumulated on the spacer elements between the plough discs is removed by a scraper plate which is fixed adjacent to the spacer elements. Earth accumulated on the disc itself tends to be removed by falling into the void created on removal of accumulated material from the spacer elements. As, however, the scraper plate is located a fixed distance from the spacer elements, earth can become compacted and pressed between the scraper plates and the spacer elements. This compacted earth does not prevent rotation of the plough discs and spacer elements, however, layers of compacted earth on the spacer elements may cause damage to the scraper plates and their mounting arms. Any damage will impair the operation of the earth clearing means. The object of the present invention is to overcome the above drawback.

DISCLOSURE OF THE INVENTION

In accordance with the present invention there is provided a device for removing earth from an axially rotatable member of an agricultural implement, said device comprising: means for mounting the device to a fixed portion of the implement; and an arm which is pivotally connected, in use, to said mounting means and spaced from the pivotal connection includes a plate, said arm having a rest position in which the plate is adjacent the member; and wherein the arrangement is such that, in use, as the member is rotated and said member accumulates earth as a layer to a predetermined thickness, said plate impinges on said layer which causes the arm to pivot towards said member and penetrate the layer thereby removing at least part of the layer.

Preferably, the device includes biasing means to return the arm to said rest position after removal of at least a part of the layer. Alternatively, said arm returns to the rest position under gravity.

Preferably, said mounting means includes means for adjusting the rest position of the arm. Alternatively, said rest position is fixed and only limited movement of the arm therefrom is allowed.

Preferably, the axial rotatable member is a spacer element for ground working elements of the agricultural implement, and the device is effective to remove a layer of earth accumulated on said spacer element.

Alternatively the axial rotatable member is a ground working element, whereby the device is effective to remove earth from the axial side of said ground working element.

BRIEF DESCRIPTION OF THE DRAWINGS

The invention also provides the combination of an agricultural implement which includes a framework having a fixed portion to which the device defined above is mounted.

A preferred embodiment of the invention is further described, by way of example only, with reference to the accompanying drawings wherein.

BEST MODE FOR CARRYING OUT THE INVENTION

Figure 3:
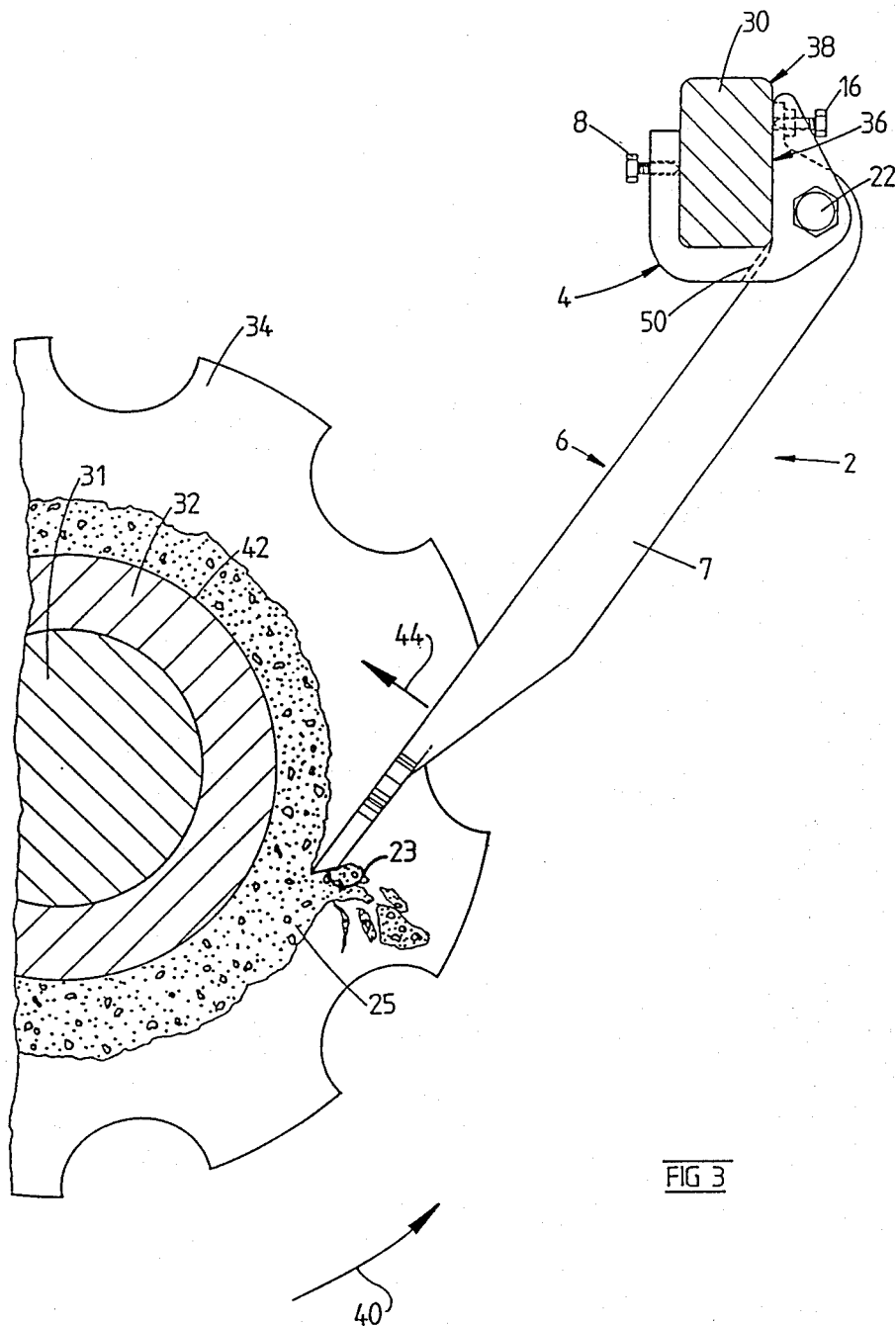
FIG. 3 is a side view of the scraper device mounted on an agricultural implement.
Figure 4:
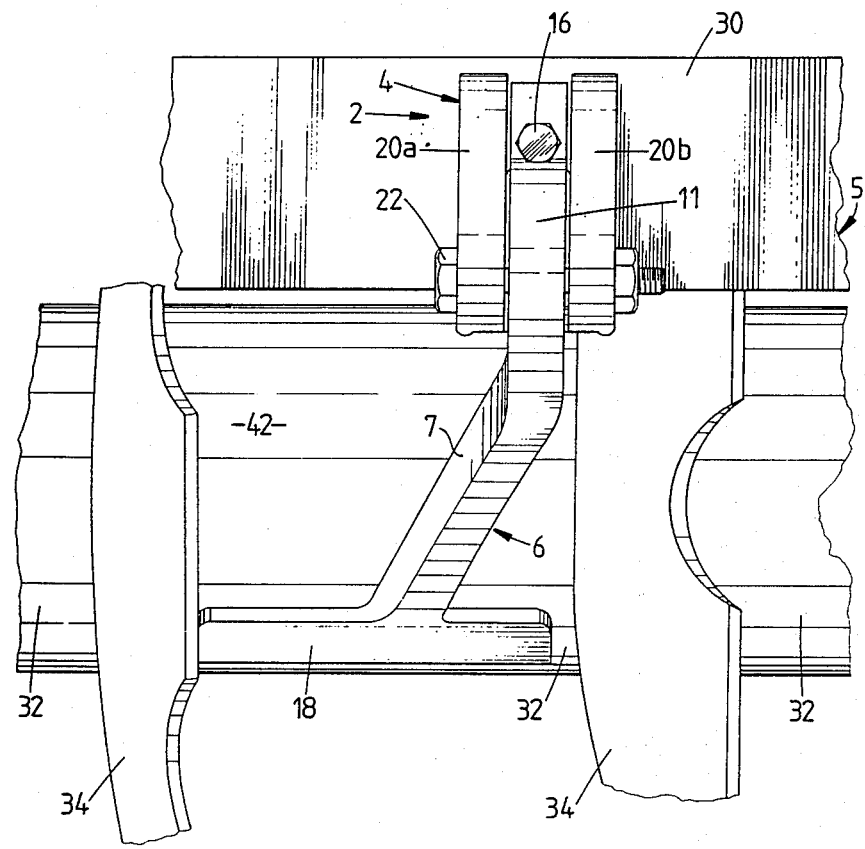
FIG. 4 is a rear view of the scraper device mounted on on an agricultural implement.

The scraper device 2, as shown in the drawings, comprises an arm 6 and a clamping member 4 which in use is clamped to an agricultural implement 5 such as a plough (see FIG. 4). Alternatively the member 4 can be welded to the agricultural implement 5. The agricultural implement 5 may be similar to that described in Australian patent application No. 27720/84 apart from the earth clearing means disclosed therein. The implement 5 has a framework of which only a transverse beam 30 is shown in FIGS. 3 and 4. The implement has a transverse shaft 31 upon which is mounted a plurality of plough discs 34 and spacer elements 32 alternately located along the shaft 31. The discs are separated by the spacer elements 32 and are supported thereby. In use, the implement 5 is moved across the ground, the discs engage the earth and rotate about the shaft 31 and in so doing effect working of the ground surface. The device 2 of the invention is for clearing accumulated earth and other material from the spacer elements 32, as will be described below.

Figure 1:
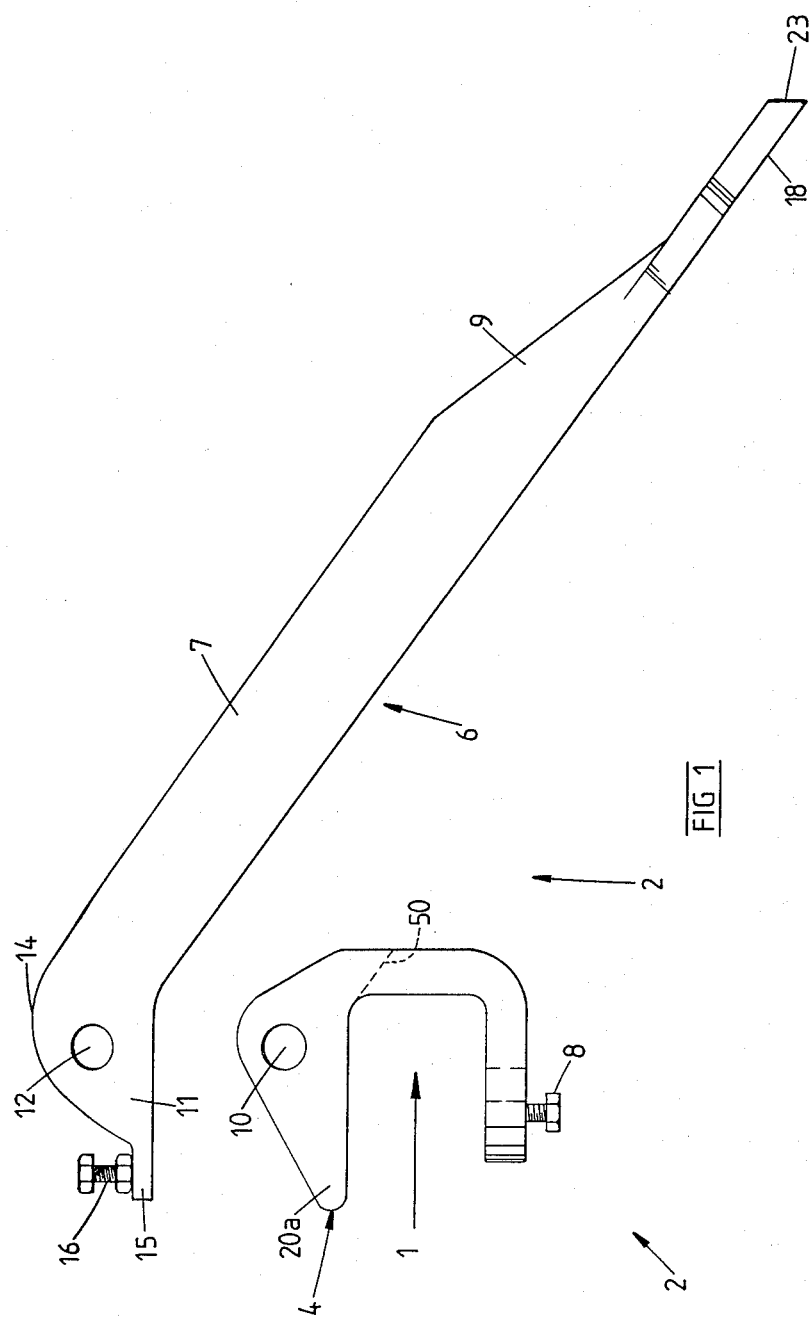
FIG. 1 is a side view of the scraper device unassembled parts of the scraper device.
Figure 2:
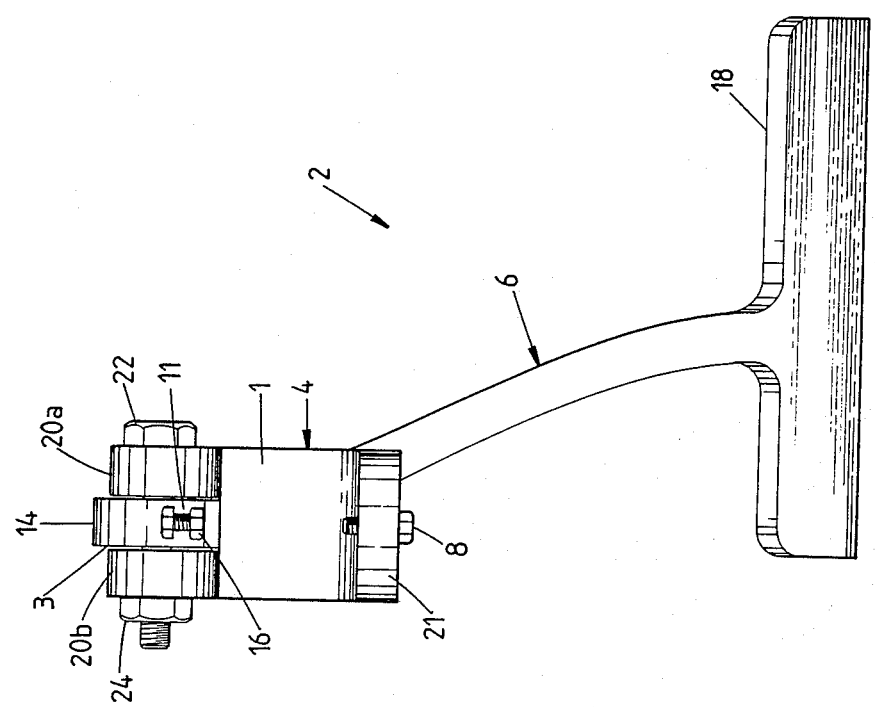
FIG. 2 is a plan view of the assembled scraper device.

As best seen in FIG. 2, the member 4 is bifurcated, a slot 3 being defined between a pair of side portions 20a and 20b. The member 4 has a recess 1 for receipt of the beam 30. A leg 21 opposite to the side portions 20a and 20b has a threaded bore through which passes a clamping bolt 8 for fixing the member 4 to the beam 30. The side portions 20a and 20b have a bolt hole 10 passing therethrough for receipt of a bolt 22 which forms the pivotal connection for the arm 6 to the member 4. Alternatively the arm 6 may be pivotally connected to a locating lug (not shown) attached to the transverse beam 30.

The arm 6 has a generally straight central portion 7 and a tapered portion 9 which is formed at its lower end with a scraper plate 18. The plate 18 may be integrally formed with the tapered portion 9 or be connected thereto by welding. The lower edge 23 and/or the side edges of the plate 18 may be sharpened. The upper end of the central portion is formed with an inclined leg 11 having a curved outer edge 14 and an upper leg 15. As best seen in FIG. 4, the central portion 7 is inclined relative to the plane which contains the leg 11 thus facilitating location of the plate 18 between adjacent discs 34. A bolt hole 12 is formed through the inclined leg 11 and the bolt 22 passes through aligned holes 10 and 12. A nut 24 is tightened on the bolt 22 to complete the pivotal connection. The bolt 22 is preferably a hightensile bolt. The arm 6 also includes an upper leg 15 adjacent to the leg 11, the leg 15 having a threaded bore which receives an adjusting bolt 16, the inner end of which is engageable with the surface of the beam 30. A number of different fastening methods, however, could be used to pivotally attach the arm 6 to the beam 30. FIG. 3 shows the assembled device 2 mounted on the beam 30 and the location of the plate 18 relative to the spacer element 32. The clamping member 4 is mounted so that the scraper plate 18 lies generally adjacent the surface 42 of the spacer element 32. The scraper device 2 is constructed so that upon clamping the device 2 to the assembly frame member 30, the center of mass of the arm 6 (including the plate 18 and leg 11) is offset, horizontally and vertically from the pivotal axis of the bolt 22, towards the spacer element 32. This ensures that either the inner face 36 of the leg 11 or the free and of the adjusting screw 16 engages the face 38 of the beam 30 in a rest position of the arm. Thus the clearance between the plate 18 and the element 32 at the rest position of the arm 6 may be adjusted by the adjusting bolt 16. The bolt 16 is easily accessable to the user, as seen from FIG. 4. The arrangement is such that the bolt 16 can adjust the rest position of the arm such that the maximum clearance between lower edge 23 and the surface 42 of the spacer element is preferably in the range 65–75 mm. The arm can swing inwardly until the edge 23 engages the surface 42 or until the arm engages an abutment such as surface 50 formed in the clamping member 4 adjacent the slot 3. The minimum clearance between the edge 23 and surface 42 is preferably in the range 0–25 mm.

If the device is mounted on the member 30 so that the center of mass of the arm 6 is not offset with respect to the axis of the bolt 22 as described above, a spring or other mechanical means may be employed in order to bias the arm 6 towards a desired rest position.

As the ground surface is worked the spacer element 32 and the plough disc 34 are rotated in the direction of arrow 40 as seen in FIG. 3. Depending upon the soil conditions some earth may be accumulated on the surface 42 of the spacer element 32 as a layer 25. When the thickness of the layer 25 grows it will engage the lower edge 23 of the plate, the edge will bite into the layer 25. This causes the arm to rotate in the direction of arrow 44. As rotation of the layer 25 continues its outer portions will be shaved off by the edge 23 of the plate and the arm 6 will continue to rotate inwardly until the edge 23 impinges on the surface 42 thereby removing substantially the whole layer 25. Alternatively the arm 6 may engage an abutment limiting inward rotation thus preventing the edge 23 engaging the surface 42 thereby leaving a thin layer of earth adhered to the element 32. In either case, after the layer 25 has been reduced by inward travel of the plate 18, the arm 6 will then be free to return to its rest position.

As seen in FIG. 4, the scraper plate 18 is wide enough so as to remove earth from substantially the entire surface 42. It has been found that removal of the layer adhered to the element 42 causes a consequential clearing of earth and other materials accumulated on the surfaces of the discs 34. This effect is achieved because the removal of the layer creates a void into which material accumulated on the discs is free to fall. The side edges of the plate 18 as it swings also tend to directly dislodge materials accumulated on the faces of the discs 34.

It will be noted that the free swinging action of the arm prevents compaction of the layer 25 on the spacer element 32 or compaction of layers on the adjacent discs.

In an alternative arrangement, the device 2 is mounted such that its scraper plate 18 is adjacent to a radial face of a disc instead of a spacer element. The lower edge 23 of the plate 18 would then remove dirt directly from the face of the disc. In this case the arm 6 would be mounted for rotation about an axis perpendicular to the axis of rotation of the discs.

Many modifications will be apparent to those skilled in the art without departing from the spirit and scope of the invention described herein. It will be appreciated that the device could be used on other implements such as road making or repairing machinery in an analogous manner.

I claim:

1. An implement including a framework, a plurality of ground working discs with spacer elements therebetween, the discs and elements being rotatably mounted on the framework, clearing means for each spacer element, said clearing means each comprising an arm having blade means thereon operable to remove earth or other material accumulated on the spacer elements and arm mounting means arranged such that the arm can swing relative to the framework about an axis which is generally parallel to the axis of rotation of the spacer element between a first position in which the blade means is spaced from the spacer element by a first predetermined distance and a second position in which the blade means engages or is spaced from the spacer element by a second predetermined distance which is less than said first predetermined distance, the arrangement being such that in use earth or other material forms a layer accumulated on the said spacer element, which layer, on engagement with the blade means, will cause the blade means to penetrate the layer and swing towards said second predetermined position, thereby removing at least a part of said layer.

2. An implement as claimed in claim 1 wherein the clearing means is biased to said first position by gravity.

3. An implement as claimed in claim 1 wherein the clearing means is biased to said first position by a spring.

4. An implement as claimed in claim 1 or 2 wherein the implement comprises a plough and wherein there are a plurality of said ground working elements mounted on shaft means extending generally transversely to the direction of movement of the plough.

5. An implement as claimed in claim 1 wherein the spacer elements are cylindrical in shape and are mounted for rotation on said shaft means and wherein said blade means is generally parallel to spacer elements and the first predetermined distance is in the range 65 to 75 mm and the second predetermined distance is in the range 0 to 25 mm.

6. An implement as claimed in claim 5 wherein the blade means is located at the base of a plane which extends between adjacent discs.

7. An implement as claimed in claim 6 wherein the blade means has a lower edge and the axis of rotation of the arms is located rearwardly of said shaft means and wherein, in the second position of the blade means, its lower edge is located beneath a horizontal plane passing through the center of the spacer elements.

8. An implement as claimed in claim 7 wherein said arm mounting means includes a body which is mounted on the framework.

9. An implement as claimed in claim 8 including means to selectively adjust the first or second predetermined position.

10. An implement as claimed in claim 9 wherein said adjusting means comprises at least one adjusting bolt.

11. A method of clearing earth or other material from spacer elements located between respective ground working discs of a plough, comprising the steps of moving the discs over the ground so that they rotate about respective axes and layers of earth or other material accumulate thereon on the spacer elements, mounting clearing means including blades relative to the element such that they can swing about axes which are generally parallel to the axes of the spacer elements between first and second extreme positions, permitting the layers to increase in thickness until the blades engage the layers, causing the blades to bite into the layers and be moved towards said elements until they reach their second extreme positions, thereby causing removal of at least parts of said layers, and after removal of said at least parts of said layers, permitting the blades to return to positions in which they are clear of any said layers still remaining on said spacer elements, thereby avoiding compaction of the layers by the blades.

* * * * *